(12) United States Patent
Zimmer

(10) Patent No.: US 12,709,247 B2
(45) Date of Patent: Aug. 18, 2026

(54) FLUIDIC DISTRIBUTION SYSTEM FOR CLEANING VEHICLE SURFACES

(71) Applicant: A. Raymond et Cie, Grenoble (FR)

(72) Inventor: Jochen Zimmer, Görwihl (DE)

(73) Assignee: A. Raymond et Cie, Grenoble (FR)

( * ) Notice: Subject to any disclaimer, the term of this patent is extended or adjusted under 35 U.S.C. 154(b) by 55 days.

(21) Appl. No.: 18/830,732

(22) Filed: Sep. 11, 2024

(65) Prior Publication Data

US 2025/0083645 A1 Mar. 13, 2025

(30) Foreign Application Priority Data

Sep. 11, 2023 (FR) ...................................... 2309529

(51) Int. Cl.

| | |
|---|---|
| ***B60S 1/52*** | (2006.01) |
| ***B60S 1/50*** | (2006.01) |
| ***B60S 1/54*** | (2006.01) |

(52) U.S. Cl.
CPC . *B60S 1/52* (2013.01); *B60S 1/50* (2013.01); *B60S 1/54* (2013.01)

(58) Field of Classification Search
None
See application file for complete search history.

(56) References Cited

U.S. PATENT DOCUMENTS

| | | | |
|---|---|---|---|
| 10,723,325 B2 | 7/2020 | Rice | |
| 10,737,662 B2 | 8/2020 | Deane et al. | |
| 2021/0402961 A1* | 12/2021 | Agrotis | B60S 1/54 |
| 2022/0017047 A1 | 1/2022 | Gulde et al. | |

FOREIGN PATENT DOCUMENTS

| | | |
|---|---|---|
| DE | 102020202570 A1 | 9/2021 |
| EP | 4194283 A1 | 6/2023 |
| WO | 2023/104551 A1 | 6/2023 |

OTHER PUBLICATIONS

French Search Report and Opinion for Application No. 2309529 dated Mar. 15, 2024, 11 pages with machine translation.

* cited by examiner

*Primary Examiner* — Eric W Golightly
(74) *Attorney, Agent, or Firm* — TraskBritt

(57) ABSTRACT

A fluidic distribution system for cleaning a surface of a sensor of a vehicle comprises: —a main tank defining a main volume and configured to store a cleaning fluid; —at least one intermediate tank having an intermediate volume smaller than the main volume; —main filling means configured to allow the filling of the at least one intermediate tank with cleaning fluid from the main tank; —an air pressure tank; —compression means configured to build up the air pressure of the air in the air pressure tank; —connection means fluidically connecting the bottom of the air pressure tank to the at least one intermediate tank so that, when the air pressure is built up, the air flowing from the air pressure tank into the at least one intermediate tank via the connection means pressurizes the cleaning fluid in the at least one intermediate tank.

20 Claims, 7 Drawing Sheets

FLUIDIC DISTRIBUTION SYSTEM FOR CLEANING VEHICLE SURFACES

CROSS-REFERENCE TO RELATED APPLICATION

This application claims the benefit of the filing date of French Patent Application Serial No. FR2309529, filed Sep. 11, 2023, for "FLUIDIC DISTRIBUTION SYSTEM FOR CLEANING VEHICLE SURFACES," the disclosure of which is incorporated herein in its entirety by this reference.

TECHNICAL FIELD

The present disclosure relates to the field of fluid distribution systems, in particular, for the cleaning of surfaces of sensors of vehicles.

More particularly, the present disclosure relates to a fluid distribution system designed to allow the cleaning of surfaces of sensors in vehicles with pressurized air and pressurized cleaning liquid, pressurized air being almost devoid of humidity.

BACKGROUND

Motor vehicles are now equipped with numerous sensors or cameras (hereinafter "sensors") for driving assistance purposes. These sensors are located around the entire perimeter of the vehicle, for example, in the bumpers and/or side skirts, and thus provide the driver or driving software with a complete view of the environment in which the vehicle is located.

However, these sensors, which are exposed to the environment, are likely to be covered with dirt or dust and, consequently, may see their performance degraded. Frequent cleaning of these sensors is therefore necessary to guarantee their performance.

In this respect, motor vehicles can be equipped with a cleaning system, in particular, with ducts and nozzles for the distribution of cleaning fluids. The nozzles are located at the ends of the fluid distribution ducts and in the vicinity of the sensors. These cleaning systems can also include automatic valves allowing the selection of the sensor(s) to be cleaned and thus limiting the consumption of cleaning fluid.

In this regard, the document [1] cited at the end of the description discloses a system configured to clean, in particular, automatically, the sensor surfaces of an autonomous vehicle.

Notably, and as depicted in FIG. 2 of document [1], the system 200 is provided with two tanks. In particular, the system 200 includes a main tank 202 and another tank 208.

The main tank 202 is configured to store a cleaning fluid at reduced pressure, such as atmospheric pressure, and is particularly implemented when cleaning surfaces that do not require consideration of high pressures. For example, the main tank 202 can be used for cleaning a windshield or a rear window of a motor vehicle.

The tank 208, for its part, is configured to store the cleaning fluid and to maintain the cleaning fluid under pressure by way of a pressurized gas and is used, in particular, when the cleaning of surfaces requires pressures well above atmospheric pressure, for example, above 4.8 bar. As an example, the tank 208 can be used for cleaning the surfaces of sensors of the motor vehicle.

The system 200 also includes a pressurized gas source 206 and a pressure transfer means 204. In particular, the pressurized gas source 206 and the pressure transfer means 204 are configured to allow the tank 208 to be filled with cleaning fluid, from the main tank, and to pressurize the cleaning fluid by injection of pressurized gas.

However, such a system is not entirely satisfactory.

Indeed, the system 200 disclosed in document [1] requires the implementation of a large capacity tank 208 in order to ensure sufficient autonomy for sensor cleaning. Also, maintaining a large volume of cleaning fluid under high pressure presents a danger for the vehicle in which it is housed.

The document [2] cited at the end of the description also discloses a system configured to clean sensor surfaces of a vehicle.

This system, particularly illustrated in FIG. 1 of document [2], includes a cleaning fluid tank 50A and a gas tank 50B. The tanks 50A and 50B are further fluidly connected so as to allow compression of the cleaning fluid in the gas tank 50B.

Nevertheless, this system is not satisfactory either.

Indeed, the system described in document [2] requires the implementation of a large gas tank 50B, which, like the system described in document [1], also presents a danger.

Moreover, the system described in document [2] includes a relatively large number of components/elements, which consequently makes it more complex to assemble and to use.

The aforementioned problems are addressed by the fluid distribution system described in the document [3] cited at the end of the description.

Notably, the document [3] relates to a fluidic delivery system for cleaning surfaces of a vehicle, the delivery system comprising:

- a main tank with a main volume and intended to store a cleaning fluid at a pressure referred to as the "main pressure";
- two secondary tanks, called, respectively, the "first tank" and the "second tank", each having a volume, referred to as a "secondary volume," smaller than the main volume;
- filling means configured to allow selective filling of both the first tank and the second tank with cleaning fluid from the main tank;
- compression means configured to inject air selectively into one and the other of the first tank and the second tank, and so as to impose a working pressure, higher than the main pressure, on the cleaning fluid likely to be present in the secondary tank in question; and
- dispensing means configured to selectively dispense, from either of the first and second tanks cleaning fluid and/or air for cleaning surfaces.

However, there are situations in which the dispensed air may be humid.

It is therefore an object of the present disclosure to provide a fluid distribution system for cleaning vehicle sensors that dispenses both air and cleaning fluid under pressure, and wherein the dispensed air is relatively dry.

BRIEF SUMMARY

The present disclosure concerns a fluidic distribution system for cleaning sensor surface of a vehicle, the distribution system comprising:

- a main tank defining a main volume and intended to store a cleaning fluid;
- at least one intermediate tank having an intermediate volume smaller than the main volume;
- main filling means configured to allow the filling of the at least one intermediate tank with cleaning fluid from the main tank;

an air pressure tank;

compression means configured to build up the air pressure of the air in the air pressure tank; and connection means fluidically connecting the bottom of the air pressure tank to the at least one intermediate tank, advantageously the top of the at least one intermediate tank, so that, when the air pressure is built up, the air flowing from the air pressure tank into the at least one intermediate tank, via the connection means, pressurizes the cleaning fluid in the at least one intermediate tank.

According to one embodiment, the fluidic distribution system further comprises:

fluid dispensing means configured to dispense the cleaning fluid from the bottom of the at least one intermediate tank the pressurized cleaning fluid for cleaning the surfaces; and air dispensing means configured to dispense air from the air pressure tank for cleaning the surfaces.

According to one embodiment, the bottom of the air pressure tank is above the top, along the vertical direction, of the at least one intermediate tank so that a fluid likely to be present in the air pressure tank can flow, by gravity, through the connection means into the at least one intermediate tank.

According to one embodiment, the at least one intermediate tank comprises two tanks, respectively, the first tank and the second tank.

According to one embodiment, the connection means are configured so that the air can flow, selectively, in one and/or the other of the first tank and the second tank.

According to one embodiment, the connection means comprises at least one valve, which advantageously may be a multiway valve.

According to one embodiment, the compression means comprises a high-pressure pump or a compressor.

According to one embodiment, the air dispensing means comprises at least one conduit, the air conduit, and at least one nozzle, the air nozzle.

According to one embodiment, the air nozzle is equipped with an air valve.

According to one embodiment, the fluid dispensing means comprises at least one fluid conduit and at least one fluid nozzle.

According to one embodiment, the fluid nozzle is equipped with a fluid valve.

According to one embodiment, the connection means comprises a check valve configured to prevent air flowing from the at least one intermediate tank toward the air pressure tank.

The present disclosure also concerns the use of the fluidic distribution system according to the present disclosure for the cleaning of a sensor surface, the use comprising the following steps:

a) a step of pressure building of air comprised in the high-pressure tank;

b) a step of compressing cleaning fluid comprised in the at least one intermediate tank, the step being executed by the flowing of the pressurized air from the air pressure tank into the at least one intermediate tank;

c) a step of dispensing the cleaning fluid and/or the pressurized air for cleaning the sensor surface.

The present disclosure also concerns an automotive vehicle equipped with sensors and comprising a fluidic distribution system according to the present disclosure for the cleaning of the surface of the sensors.

BRIEF DESCRIPTION OF THE DRAWINGS

Other features and advantages will be better understood after reading the following description of the fluidic distribution system according to the present disclosure, provided as non-limiting examples only, with reference to the accompanying drawings in which.

DETAILED DESCRIPTION

Figure 1:
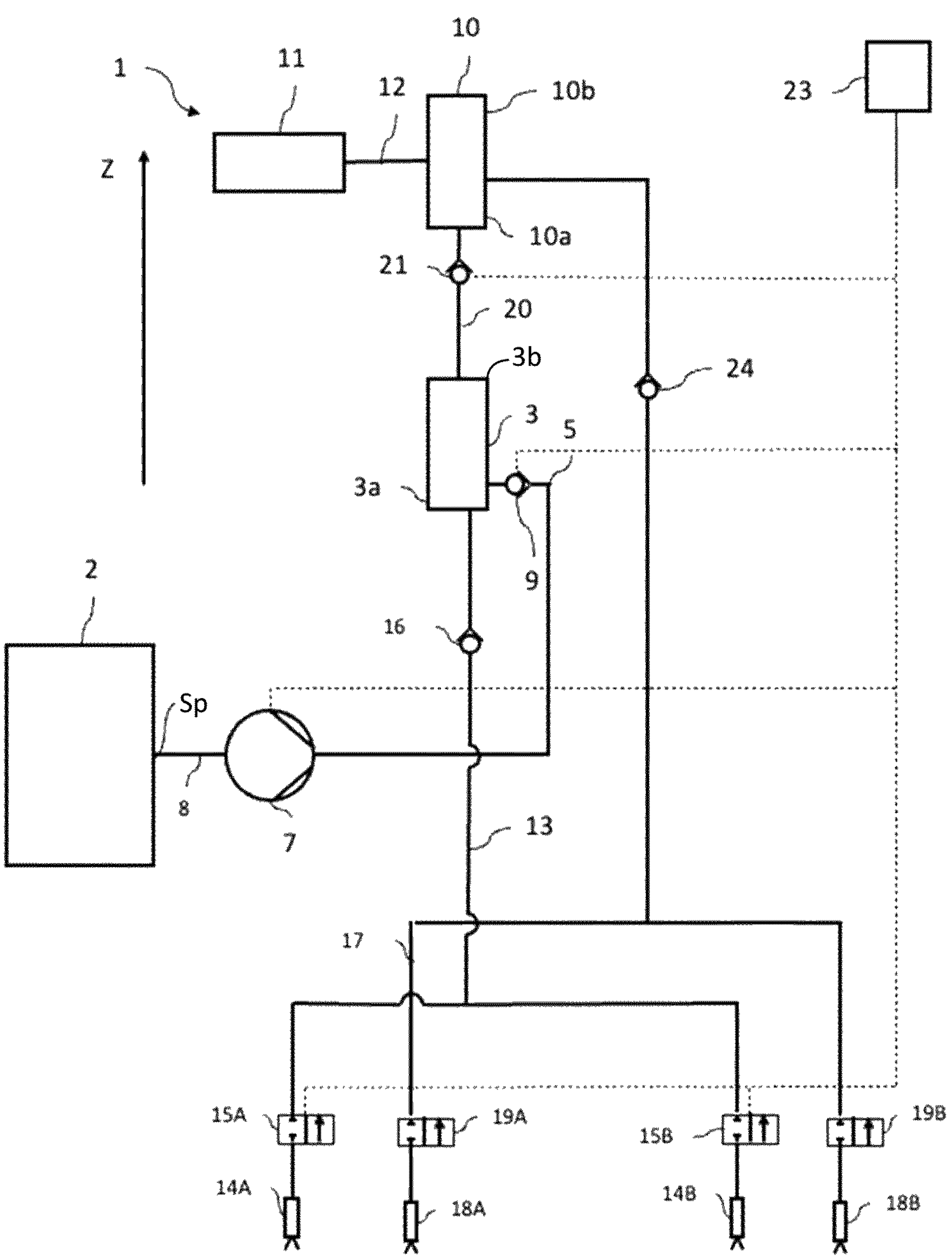
FIG. 1 is a schematic representation of a fluidic distribution system according to the first embodiment of the present disclosure.

Reference will now be made in detail to embodiments of the present disclosure, examples of which are illustrated in the accompanying drawings. It is to be understood that other embodiments may be utilized, and structural and functional changes may be made without departing from the scope of the invention as defined by the claims. Moreover, features of the embodiments may be combined, switched, or altered without departing from the scope of the invention as defined by the claims.

As such, the following description is presented by way of illustration and does not limit the various alternatives and modifications that can be made to the illustrated embodiments while remaining within the spirit and scope of the present disclosure.

As used herein, the words "top" and "bottom" are defined with respect to the vertical direction. It is therefore understood that the "top" and the "bottom" of a component correspond to sections of the component while in use and according to the vertical direction.

The present disclosure relates to a fluidic distribution system for cleaning the surface of sensors in a motor vehicle, which may be an autonomous vehicle in some embodiments.

In this regard, the fluidic distribution system according to the present disclosure is particularly suitable for removing dust and/or dirt that may be present on the surface of the sensor(s) of a vehicle.

These sensors may include, but are not limited to, a camera, LIDAR, RADAR, or any other type of sensor that may be implemented in a motor vehicle. In particular, the fluidic distribution system according to the present disclosure may comprise nozzles configured to project cleaning fluid and/or pressurized air onto the surfaces of the sensors. In this regard, the nozzles are arranged in proximity to the surfaces and may be static or movable.

Thus, the present disclosure relates to a fluidic distribution system for cleaning a surface of a sensor of a vehicle, the distribution system comprising:

- a main tank defining a main volume and intended to store a cleaning fluid;
- at least one intermediate tank having an intermediate volume smaller than the main volume;
- main filling means configured to allow the filling of the at least one intermediate tank with cleaning fluid from the main tank;
- an air pressure tank;
- compression means configured to build up the air pressure of the air in the air pressure tank;
- connection means fluidically connecting the bottom of the air pressure tank to the at least one intermediate tank so that, when the air pressure is built up, the air flowing from the air pressure tank into the at least one intermediate tank, via the connection means, pressurizes the cleaning fluid in the at least one intermediate tank;
- fluid dispensing means configured to dispense the pressurized cleaning fluid from the bottom of the at least one intermediate tank for cleaning the surfaces; and
- air dispensing means configured to dispense air from the air pressure tank for drying the surfaces.

FIG. 1 illustrates a fluidic distribution system according to a first embodiment of the present disclosure.

In particular, the fluidic distribution system 1 comprises a main tank 2 intended to store cleaning fluid, for example, at a pressure referred to as a "main pressure." In particular, the main tank 2 has a volume, referred to as the "main volume," of several liters, for example, more than 3 liters, or even more than 4 liters. The main pressure may be less than 1.5 bar, and, in particular, equal to the atmospheric pressure in some embodiments.

The fluidic distribution system 1 also includes at least one intermediate tank. In this first embodiment, the at least one intermediate tank comprises only one tank 3. It is understood, however, that the present disclosure is not limited to embodiments having only a single tank 3. In particular, the description of the first embodiment gives the general principles of the present disclosure so that those of ordinary skill in the art shall be able to adapt them to a plurality of intermediate tanks, notably two intermediate tanks 3 and 3' as set forth in a second embodiment, which is subsequently described herein.

The intermediate tank 3, while in use, may be oriented with respect to the vertical axis z. Notably, the intermediate tank 3 comprises, along the vertical axis z, a bottom section 3*a* (the "bottom") and a top section 3*b* (the "top"). In other words, the top 3*b* is directly above the bottom 3*a*.

Tank 3 delimits a volume that is smaller than the main volume, advantageously, which is less than one third of the main volume, even more advantageously, less than one fifth of the main volume. For example, the volume of tank 3 is less than 700 mL, advantageously less than 500 mL.

The fluidic distribution system 1 according to the present disclosure also comprises main filling means configured to allow the filling of the tank 3 with cleaning fluid from the main tank 2.

In particular, the main filling means may comprise conduits fluidically connecting the main tank 2 with the tank 3. Thus, the filling means may comprise a conduit 5 fluidically connecting the main tank 2 with the tank 3.

The main filling means can also comprise a pump, referred to as the filling pump 7, interposed between the main tank 2 and the conduit 5. The filling pump 7 can notably comprise a pump (a low-pressure pump or a high-pressure pump). For example, the filling pump 7 can be configured to take cleaning fluid from the main tank 2 and inject it into the conduit 5 at a pressure lower than 1.5 bar.

The main filling means may further comprise a main conduit 8 fluidly connecting an outlet, referred to as the main outlet Sp, of the main tank 2 with the conduit 5. In this respect, the filling pump 7 may be connected (disposed) on the main conduit 8.

In particular, and as illustrated in FIG. 1, the main filling means may comprise a valve 9 disposed on the conduit 5.

The valve 9 can comprise a solenoid valve, and more particularly a solenoid valve provided with a check valve.

The fluidic distribution system also includes an air pressure tank 10. Advantageously, the air pressure tank 10 can be disposed above the tank 3 along the vertical direction z. The air pressure tank 10 comprises a bottom section 10*a* (the "bottom") and a top section 10*b* (the "top"). In addition, the air pressure tank 10 can be disposed so that the bottom 10*a* is above the top 3*b*. According to the present disclosure, other configurations can be contemplated. In particular, the general principle of the present disclosure does not impose this specific positioning of the air pressure tank with respect to the tank 3. Notably, as a non-limiting example, the tank 3 and the air pressure tank 10 can be positioned next to each other. In addition, the tank 3 and the air pressure tank 10 may be integral to each other. In particular, the tank 3 and the air pressure tank 10 can be a single unitary tank.

The fluidic distribution means 1 further comprise compression means configured to build up the air pressure of the air in the air pressure tank 10 in the 4 bar to 10 bar pressure range and, in particular, around 8 bars. In this regard, the compression means can comprise a high-pressure pump 11 (or a compressor).

The compression means can comprise a conduit 12 fluidically connecting the high-pressure pump 11 with the air pressure tank 10.

The fluidic distribution system 1 also comprises connection means 20, typically a conduit, fluidically connecting the bottom 10*a* to the tank 3 so that, when the air pressure is built up, the air flowing from the air pressure tank 10 into the tank 3, via the connection means, pressurizes the cleaning fluid in the tank 3. The connection means can comprise a check valve 21 configured to prevent air flowing from the at least one intermediate tank toward the air pressure tank. In a very advantageous embodiment, connection means 20 can connect the bottom 10*a* to top 3*b* of the tank 3.

The fluidic distribution system 1 can further comprise fluid dispensing means configured to dispense (or spray) the cleaning fluid, from the bottom 3*a* of the tank 3, cleaning fluid, notably pressurized cleaning fluid, for cleaning the surfaces of the sensors.

In this regard, the fluid dispensing means comprise at least one fluid conduit 13 and at least one fluid nozzle 14A, 14B.

The fluid dispensing means can further comprise fluid valves 15A, 15B, each fluid valve 15A and 15B being dedicated to a specific fluid nozzle 14A and 14B. The fluid conduits 13 can further comprise a check-valve 16 configured for preventing a back flow of the cleaning fluid into the tank 3.

The fluidic distribution system 1 can further comprise air dispensing means configured to dispense (or spray) air from the air pressure tank for drying the surfaces of the sensors.

In this regard, the air dispensing means comprise at least one air conduit 17 and at least one air nozzle 18A, 18B.

The air dispensing means can further comprise air valves 19A, 19B, each air valve 19A and 19B being dedicated to a specific air nozzle 18A and 18B. The air conduit 17 can further comprise a check-valve 24 configured for preventing a back flow of the air into the air pressure tank 10.

The present disclosure also concerns the use of the fluidic distribution system according to the present disclosure.

Notably, the use of the fluidic distribution system comprises the following steps:

a) a step of building up a pressure of air in the high-pressure tank;

b) a step of compressing cleaning fluid in the at least one intermediate tank, the step being executed by the flowing of the pressurized air from the air pressure tank into the at least one intermediate tank;

c) a step of dispensing the cleaning fluid and/or the pressurized air for cleaning the sensor surface.

Figure 2:
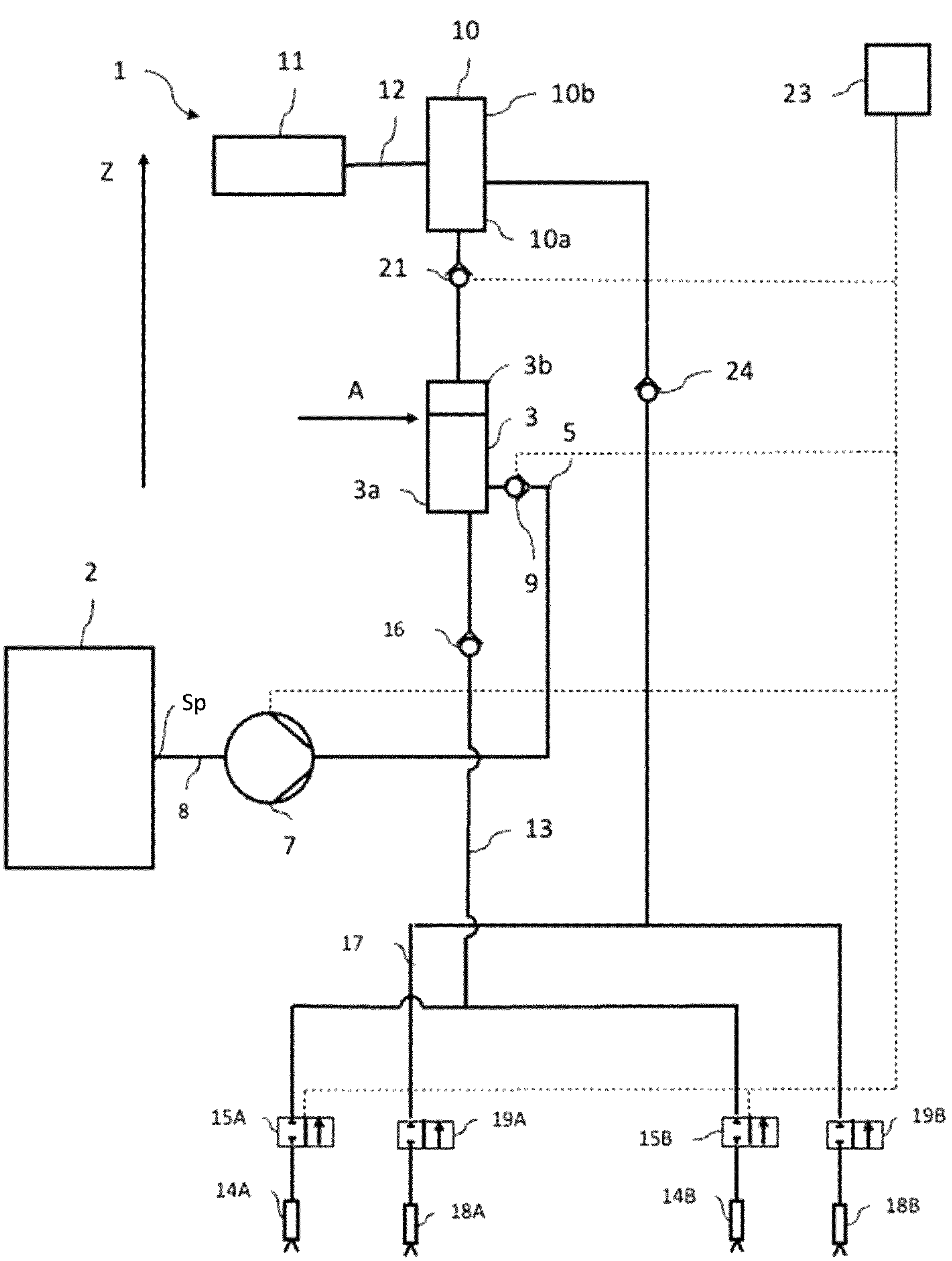
FIG. 2 illustrates the fluidic distribution system according to the first embodiment of the present disclosure and wherein the tank is partially filled with the cleaning fluid, the fluid level being indicated with the arrow A.

FIG. 2 illustrates the fluidic distribution system 1 according to the first embodiment of the present disclosure and illustrates the tank 3 partially filled with the cleaning fluid, the fluid level being indicated with the arrow A.

Figure 3:
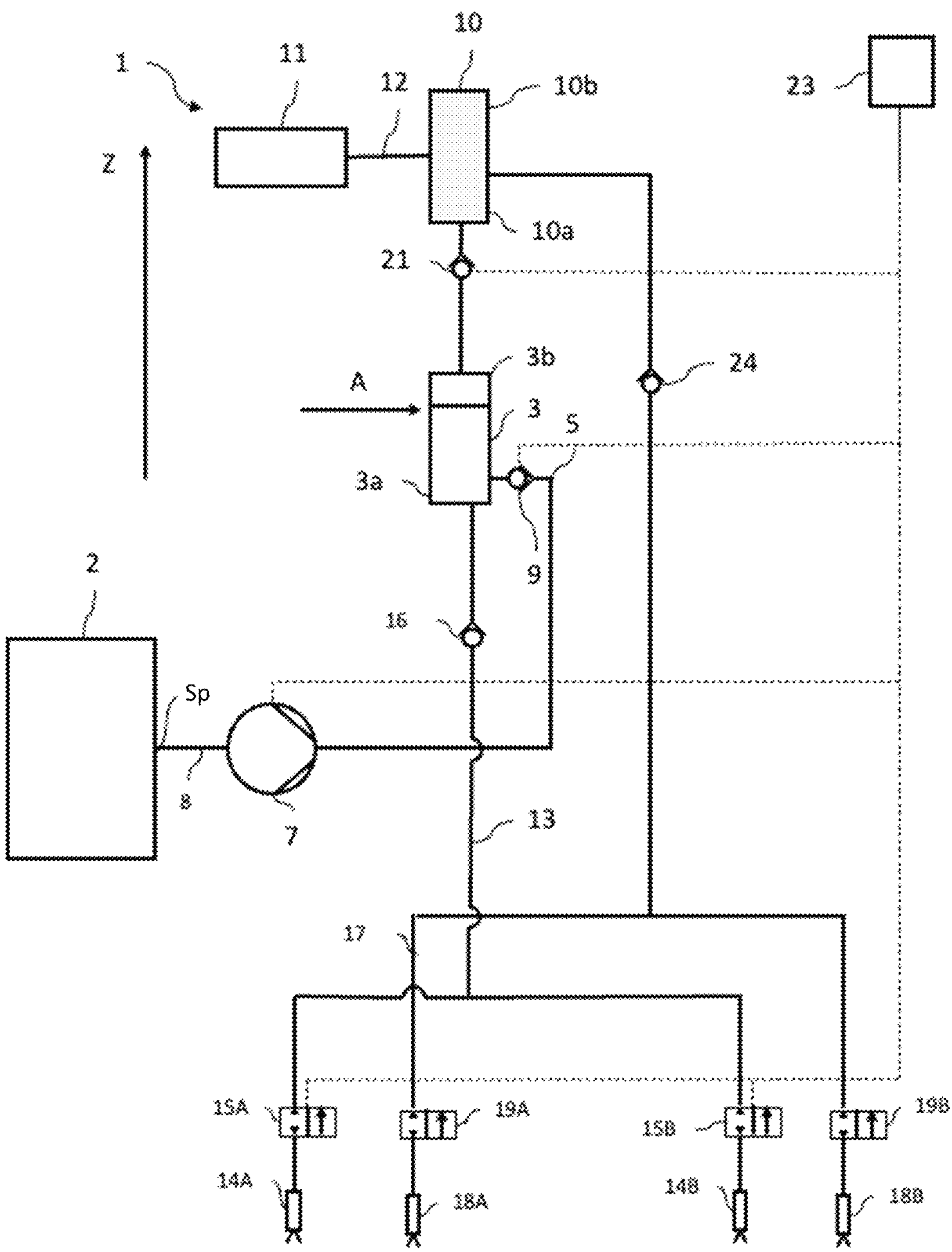
FIG. 3 illustrates the fluidic distribution system according to the first embodiment of the present disclosure and wherein the air pressure tank is filled air likely to contain some humidity.

FIG. 3 illustrates the fluidic distribution system 1 according to the first embodiment of the present disclosure and illustrates that the air pressure tank 10 is filled with air containing some humidity.

Figure 4:
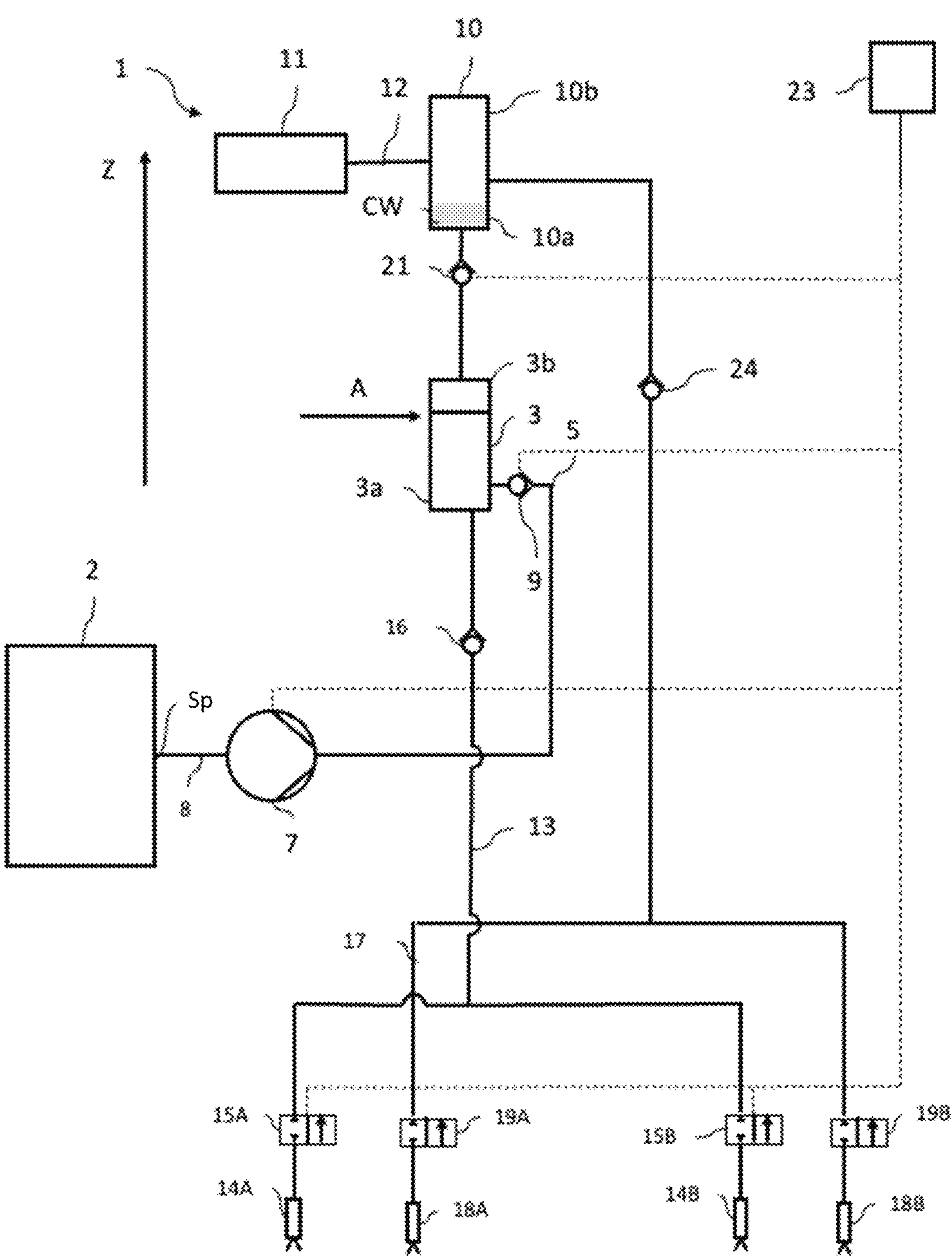
FIG. 4 illustrates the fluidic distribution system according after execution of step a) of the use of the fluidic distribution system.

FIG. 4 illustrates the fluidic distribution system 1 according to the first embodiment and wherein the air filling the air pressure tank 10 is pressurized by the compressor (step a)). The air pressure in the air pressure tank can be in the 4 bar to 10 bar pressure range so that the humidity contained in the air condenses (reference CW) and falls, by gravity, to the bottom section 10*a* of the air pressure tank 10. Condensed water then flows, essentially by overpressure, through the connection means into the tank 3. In other words, the overpressure is the main driver for the transfer of the condensed water toward the tank 3.

Figure 5:
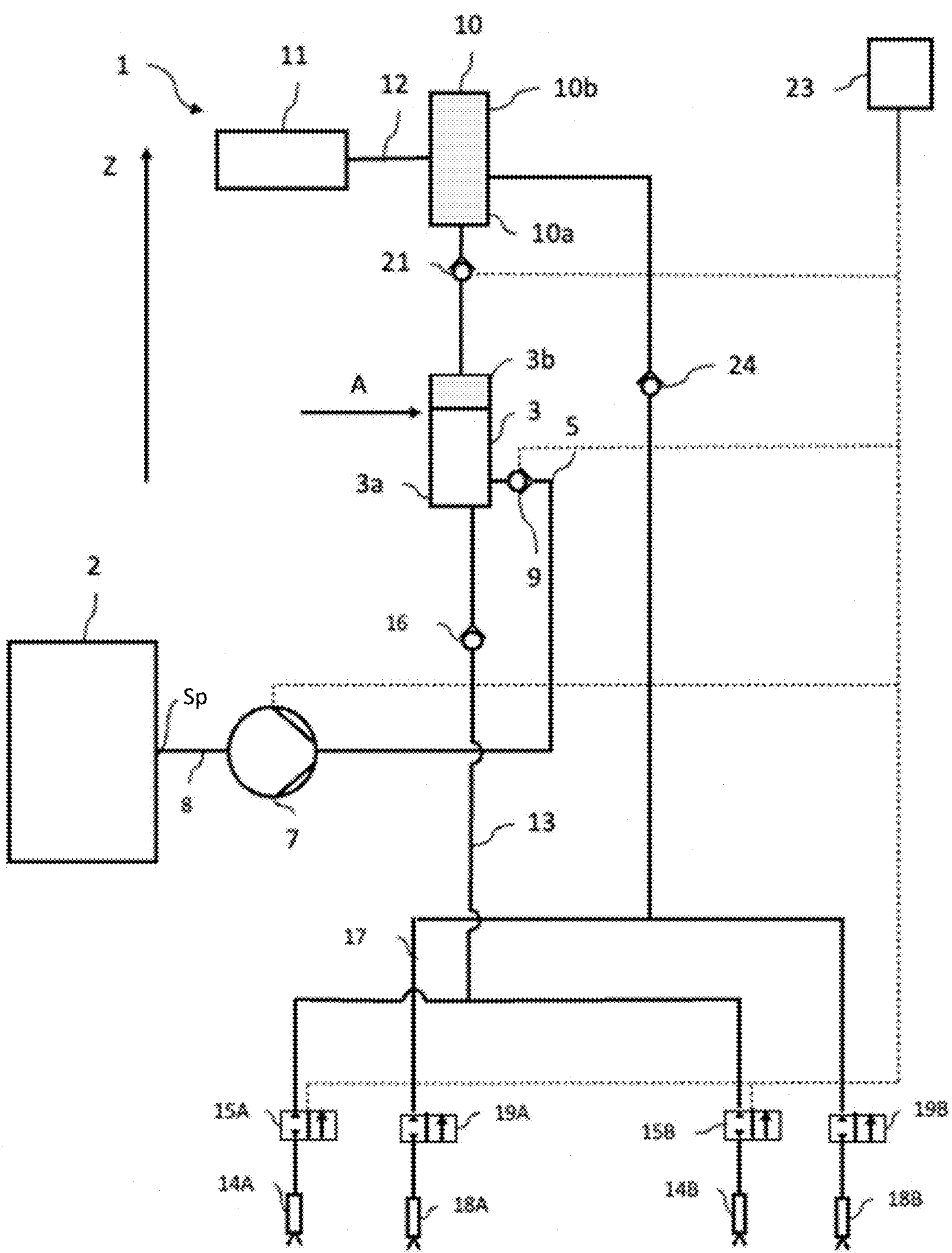
FIG. 5 illustrates the fluidic distribution system according after execution of step b) of the use of the fluidic distribution system.

The pressurized air also flows from the air pressure tank into the tank 3, via the connection means, and pressurizes the cleaning fluid in the tank 3 (step b), as illustrated in FIG. 5. The air flow stops when an air pressure balance is reached in both the air pressure tank 10 and in the tank 3. The pressurized air after the execution of step b) is at least substantially dry.

After the execution of step b), the fluidic distribution system is in condition for spraying either cleaning fluid with the fluid nozzles or pressurized dry air with the air nozzles.

Figure 6:
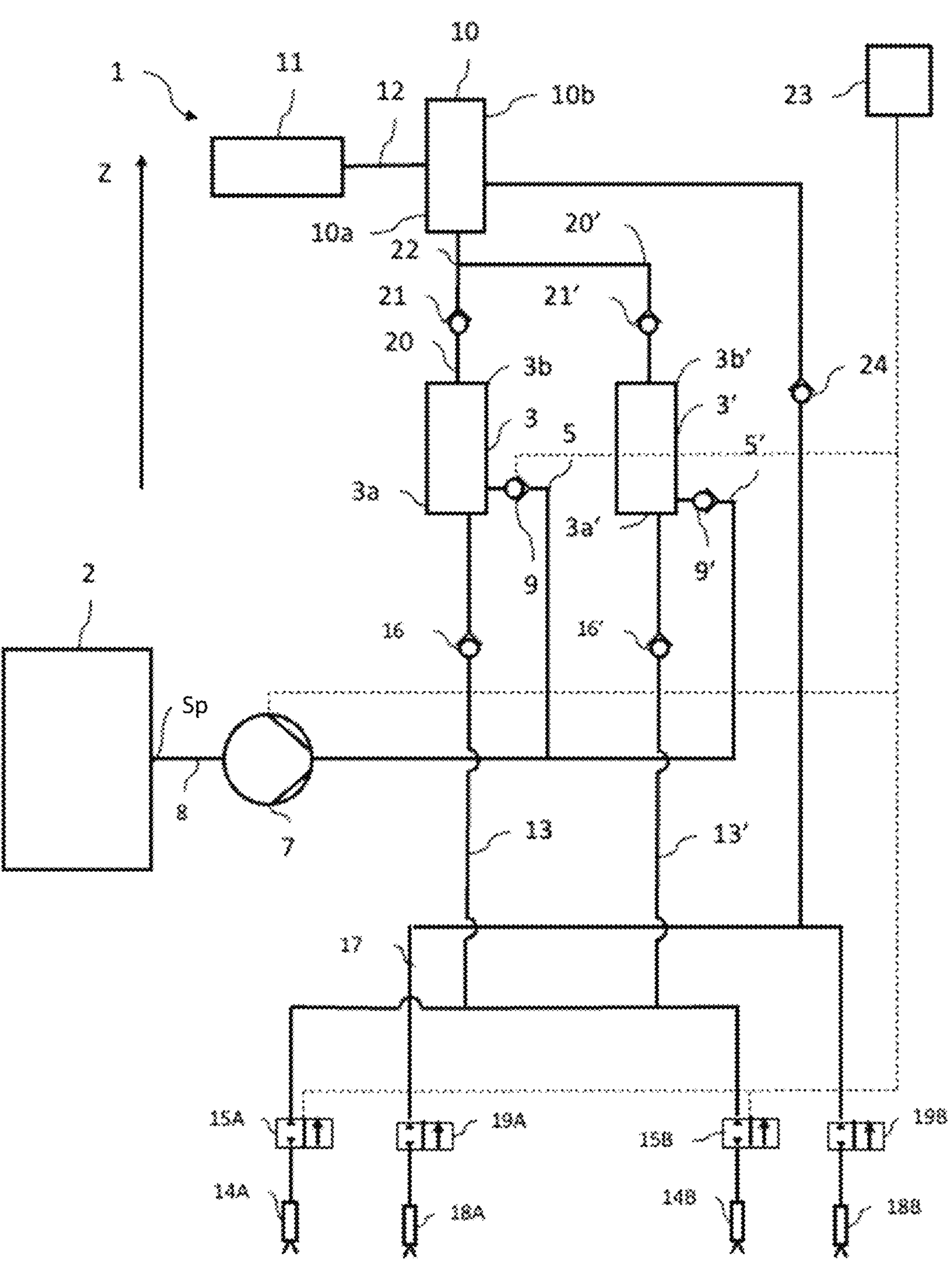
FIG. 6 is a schematic representation of a fluidic distribution system according to a second embodiment of the present disclosure.

FIG. 6 represents the fluidic distribution system 1 according to a second embodiment. This second embodiment essentially incorporates all of the features of the first embodiment.

Notably, this second embodiment differs from the first embodiment in that it comprises a second intermediate tank 3' (in addition to tank 3). In particular, the tank 3' is fluidically connected, from is top 3*b*' to the bottom 10*a* of the air pressure tank 10 via the connection means. The connection means can comprise a check valve 21' to prevent any back flow of the air from the tank 3' toward the air pressure tank 10.

The fluid dispensing means can also be configured to dispense the cleaning fluid from the bottom 3*a*' of the tank 3', which may be pressurized, for cleaning the surfaces of the sensors.

In this regard, the fluid dispensing means comprise at least one fluid conduit 13' (in addition to fluid conduit 13), connecting the bottom 3*a*' to the fluid nozzle 14A, 14B associated with the fluid valves 15A, 15B. A check-valve 16' can also be arranged for preventing a back flow of the cleaning fluid into the tank 3'.

Finally, the connection means comprise at least one valve 22, advantageously, a multiway valve 22. Notably the at least one valve 22 is configured to selectively fluidically connect one and/or the other of the tank 3 and the tank 3' with the air pressure tank 10. This arrangement thus allows the system to selectively compress, with the pressurized air, the cleaning fluid contained in the tank 3 and/or the tank 3'.

The main advantage of the implementation of the two tanks 3 and 3' is to make it possible to spray the cleaning fluid in a continuous manner as described in document [3].

Figure 7:
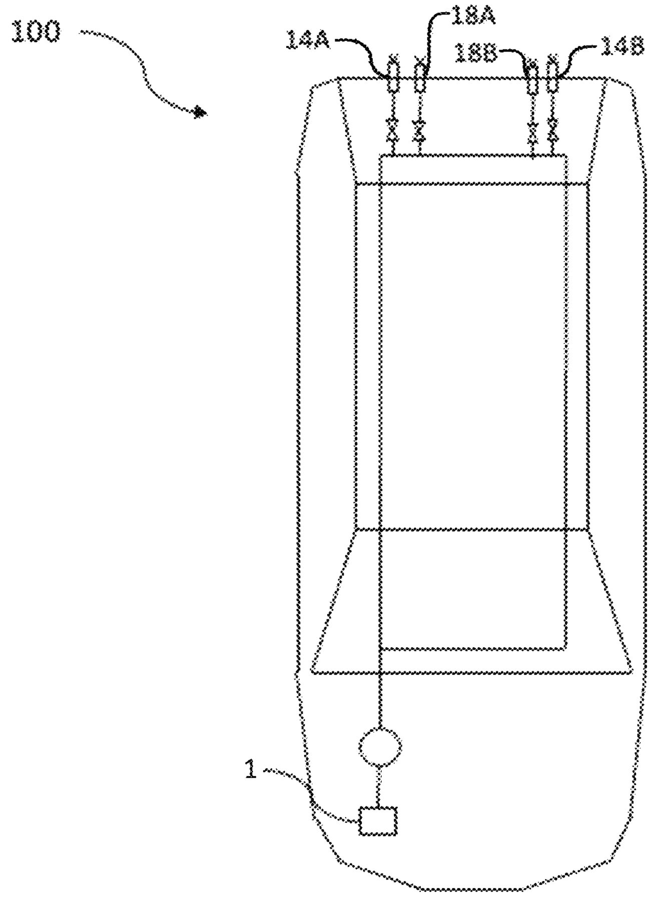
FIG. 7 is a schematic representation of an automotive vehicle equipped with sensors and comprising a fluidic distribution system according to the present disclosure for the cleaning of the surface of the sensors.

The present disclosure also concerns an automotive vehicle 100 (FIG. 7) equipped with sensors and comprising a fluidic distribution system according to the present disclosure for the cleaning of the surface of the sensors.

Of course, the present disclosure is not limited to the embodiments described and variant embodiments can be made without departing from the scope of the present disclosure as defined by the claims.

REFERENCES

[1] U.S. Pat. No. 10,723,325B2;
[2] DE10 2019 125 970 A1;
[3] EP 4 194 283 A1.

What is claimed is:

1. A fluidic distribution system for cleaning a surface of a sensor of a vehicle, the fluid distribution system comprising:

a main tank defining a main volume and configured to store a cleaning fluid;

at least one intermediate tank having an intermediate volume smaller than the main volume;

main filling means configured to allow the filling of the at least one intermediate tank with cleaning fluid from the main tank;

an air pressure tank;

compression means configured to build up the air pressure of the air in the air pressure tank; and connection means fluidically connecting a bottom of the air pressure tank to the at least one intermediate tank, so that, when the air pressure is built up, the air flowing from the air pressure tank into the at least one intermediate tank, via the connection means, pressurizes the cleaning fluid in the at least one intermediate tank.

2. The fluidic distribution system of claim 1, further comprising:

fluid dispensing means configured to dispense pressurized cleaning fluid from a bottom of the at least one intermediate tank for cleaning the surface; and air dispensing means configured to dispense air from the air pressure tank for cleaning the surface.

3. The fluidic distribution system of claim 2, wherein the bottom of the air pressure tank is above a top of the at least one intermediate tank along a vertical direction so that any fluid present in the air pressure tank can flow by gravity through the connection means into the at least one intermediate tank.

4. The fluidic distribution system of claim 3, wherein the at least one intermediate tank comprises a first tank and a second tank.

5. The fluidic distribution system of claim 4, wherein the connection means are configured so that the air can flow, selectively, into the first tank and/or the second tank.

6. The fluidic distribution system of claim 5, wherein the connection means comprises at least one valve.

7. The fluidic distribution system of claim 6, wherein the at least one valve comprises a multiway valve.

8. The fluidic distribution system of claim 6, wherein the compression means comprises a pump or a compressor.

9. The fluidic distribution system of claim 8, wherein the air dispensing means comprises at least one air conduit and at least one air nozzle.

10. The fluidic distribution system of claim 9, wherein the air nozzle includes an air valve.

11. The fluidic distribution system of claim 2, wherein the fluid dispensing means comprises at least one fluid conduit and at least one fluid nozzle.

12. The fluidic distribution system of claim 11, wherein the fluid nozzle includes a fluid valve.

13. The fluidic distribution system of claim 2, wherein the air dispensing means comprises at least one air conduit and at least one air nozzle.

14. The fluidic distribution system according to claim 1, wherein the connection means comprises a check valve configured to prevent air flowing from the at least one intermediate tank toward the air pressure tank.

15. The fluid distribution system of claim 1, wherein the connection means fluidically connects the bottom of the air pressure tank to a top of the at least one intermediate tank.

16. The fluidic distribution system of claim 1, wherein the bottom of the air pressure tank is above a top of the at least one intermediate tank along a vertical direction so that any fluid present in the air pressure tank can flow by gravity through the connection means into the at least one intermediate tank.

17. The fluidic distribution system of claim 1, wherein the at least one intermediate tank comprises a first tank and a second tank.

18. The fluidic distribution system of claim 1, wherein the compression means comprises a pump or a compressor.

19. An automotive vehicle including at least one sensor and comprising a fluidic distribution system according to claim 1 for cleaning a surface of the at least one sensor.

20. A method of using a fluidic distribution system for cleaning a surface of a sensor of a vehicle, the method comprising:

storing cleaning fluid in a main tank defining a main volume and configured to store the cleaning fluid;

moving fluid from the main tank to at least one intermediate tank using main filling means configured to allow the filling of the at least one intermediate tank, the at least one intermediate tank having an intermediate volume smaller than the main volume;

building up of air pressure of air in an air pressure tank using compression means configured to build up the air pressure of the air in the air pressure tank;

compressing cleaning fluid in the at least one intermediate tank by flowing pressurized air from the air pressure tank into the at least one intermediate tank through connection means fluidically connecting a bottom of the air pressure tank to the at least one intermediate tank so that, when the air pressure is built up, the air flowing from the air pressure tank into the at least one intermediate tank, via the connection means, pressurizes the cleaning fluid in the at least one intermediate tank; and dispensing the cleaning fluid and/or the pressurized air for cleaning the surface of the sensor.

* * * * *